(12) United States Patent
Pierluissi et al.

(10) Patent No.: US 9,677,501 B2
(45) Date of Patent: Jun. 13, 2017

(54) THREE STREAM, VARIABLE AREA FIXED APERTURE NOZZLE WITH PNEUMATIC ACTUATION

(71) Applicant: Rolls-Royce North American Technologies, Inc., Indianapolis, IN (US)

(72) Inventors: Anthony F. Pierluissi, Indianapolis, IN (US); Kenneth M. Pesyna, Carmel, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 567 days.

(21) Appl. No.: 14/209,806

(22) Filed: Mar. 13, 2014

(65) Prior Publication Data

US 2014/0263737 A1    Sep. 18, 2014

Related U.S. Application Data

(60) Provisional application No. 61/786,055, filed on Mar. 14, 2013, provisional application No. 61/780,807, (Continued)

(51) Int. Cl.
*F02K 1/15* (2006.01)
*F02K 1/12* (2006.01)
(Continued)

(52) U.S. Cl.
CPC .......... *F02K 1/1223* (2013.01); *F02K 1/1207* (2013.01); *F02K 1/1238* (2013.01); *F02K 1/15* (2013.01); *F02K 1/80* (2013.01); *F02K 3/075* (2013.01); *F02K 3/077* (2013.01); *F02K 3/115* (2013.01); *F05D 2250/411* (2013.01);
(Continued)

(58) Field of Classification Search
CPC ........ F02K 1/1223; F02K 1/80; F02K 1/1238; F02K 3/115; F02K 1/15; F02K 3/075; F02K 3/077; F02K 1/1207; F05D 2270/051; F05D 2270/66; F05D 2260/56; F05D 2260/50; F05D 2250/411; Y02T 50/671
See application file for complete search history.

(56) References Cited

U.S. PATENT DOCUMENTS 3,367,579 A    2/1968   Mehr
3,622,075 A    11/1971  Harris
(Continued)

OTHER PUBLICATIONS

International Search Report PCT/US2014/026656 mailed on Nov. 27, 2014.

*Primary Examiner* — Sarang Afzali
*Assistant Examiner* — Ruth G Hidalgo-Hernandez
(74) *Attorney, Agent, or Firm* — Fishman Stewart PLLC

(57) ABSTRACT

An exemplary nozzle having a variable internal exhaust area for a gas turbine engine can have a plurality of flap trains extending around a periphery of the gas turbine engine. Each flap train can include a convergent flap pivotally attached to an engine body and a divergent flap pivotally attached to the engine body downstream of the convergent flap. The nozzle can further have a fluid circuit in communication with the convergent and divergent flaps and configured to pivot the convergent and divergent flaps between a radially inward position and a radially outward position.

20 Claims, 6 Drawing Sheets

Related U.S. Application Data filed on Mar. 13, 2013, provisional application No. 61/780,772, filed on Mar. 13, 2013.

(51) Int. Cl.
  *F02K 3/075* (2006.01)
  *F02K 3/077* (2006.01)
  *F02K 3/115* (2006.01)
  *F02K 1/80* (2006.01)

(52) U.S. Cl.
  CPC ...... *F05D 2260/50* (2013.01); *F05D 2260/56* (2013.01); *F05D 2270/051* (2013.01); *F05D 2270/66* (2013.01); *Y02T 50/671* (2013.01)

(56) References Cited

U.S. PATENT DOCUMENTS

| | | |
|---|---|---|
| 3,667,399 A | 6/1972 | Czarnecki |
| 4,000,854 A * | 1/1977 | Konarski ............... F02K 1/006 239/265.35 |
| 4,052,007 A | 10/1977 | Willard |
| 4,420,932 A | 12/1983 | Mendez et al. |
| 4,587,806 A | 5/1986 | Madden |
| 4,714,197 A | 12/1987 | Thayer et al. |
| 4,994,660 A | 2/1991 | Hauer |
| 5,081,835 A | 1/1992 | Ewing, Jr. |
| 5,103,639 A | 4/1992 | Wolf |
| 5,186,390 A | 2/1993 | Enderle et al. |
| 5,329,763 A | 7/1994 | Ibarreche Mendia et al. |
| 5,833,139 A | 11/1998 | Sondee et al. |
| 7,546,738 B2 | 6/2009 | Peters |
| 7,770,379 B2 | 8/2010 | Roberts |
| 7,793,504 B2 | 9/2010 | Baker et al. |
| 7,975,466 B1 | 7/2011 | Rodgers |
| 2007/0256419 A1* | 11/2007 | Baker ................... F02K 1/1292 60/771 |

* cited by examiner

THREE STREAM, VARIABLE AREA FIXED APERTURE NOZZLE WITH PNEUMATIC ACTUATION

CROSS-REFERENCE TO RELATED APPLICATIONS

This application claims priority to U.S. Provisional Patent Application No. 61/780,807, filed Mar. 13, 2013, and U.S. Provisional Patent Application No. 61/786,055, filed Mar. 14, 2013, now U.S. patent application Ser. No. 14/209,749, titled "COMPACT ACTUATION SYSTEM FOR FLOW NOZZLE," and U.S. Provisional Patent Application No. 61/780,772, filed Mar. 13, 2013, now U.S. patent application Ser. No. 14/209,687, titled "THREE STREAM, VARIABLE AREA, VECTORABLE NOZZLE," the contents of which are hereby incorporated in their entirety.

FIELD OF TECHNOLOGY

The invention generally relates to variable area exhaust nozzles for variable cycle gas turbine engines, and more particularly to a compact system and process for actuating the variable area exhaust nozzles.

BACKGROUND

Gas turbine engines may have variable area exhaust nozzles with a convergent/divergent configuration for providing multiple nozzle positions to manage flow or control the thrust produced by the gas turbine engines. In a variable cycle engine, it might be necessary to accommodate multiple area changes in separate flow paths. The exit aperture may also be fixed, to allow for better aircraft integration. These gas turbine engines may include somewhat large and complex systems for actuating the variable area exhaust nozzles.

Therefore, a need exists for a variable internal area exhaust nozzle for a gas turbine engine that has a simple construction configured to improve overall engine performance.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Referring to the Figures, one exemplary exhaust nozzle (hereinafter "nozzle") may have a three-stream variable internal flow area and fixed overall exit aperture for a high performance gas turbine engine. The nozzle may utilize a fluid circuit to operate multiple flap trains and provide a combination of flow streams to accommodate various flight operating conditions while maintaining the fixed exit aperture. While the exemplary illustration of the fluid circuit is a pneumatic circuit, the nozzle may be operated by other non-pneumatic systems, such as hydraulic circuit, and integrated in other suitable applications. Furthermore, the nozzle may include a variable exit aperture.

Figure 1:
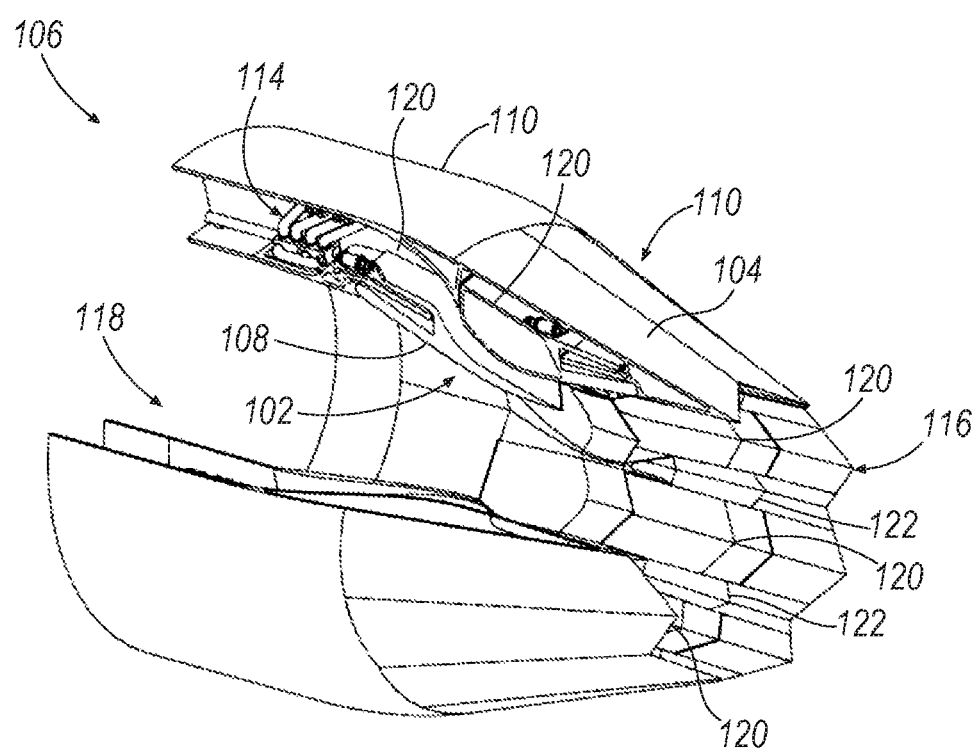
FIG. 1 illustrates a perspective cutaway view of one exemplary nozzle for a gas turbine engine nozzle having a cyclic symmetric 20 flaps.
Figure 2:
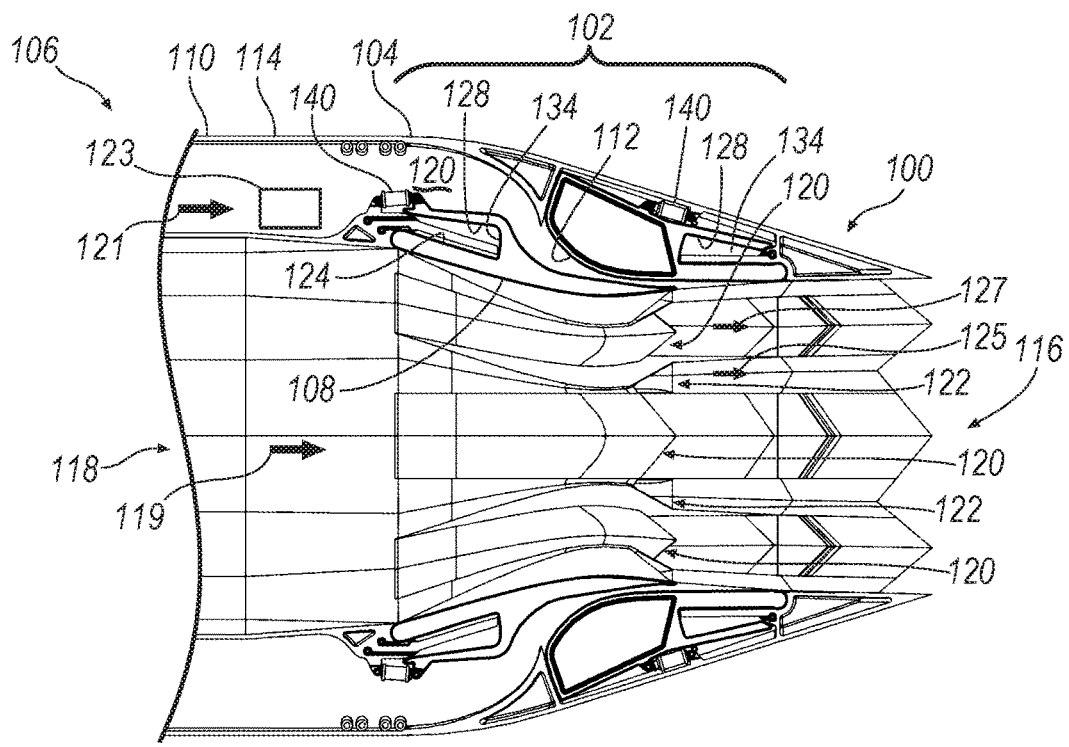
FIG. 2 illustrates a schematic cross-sectional view of the nozzle of FIG. 1, showing the nozzle disposed in an afterburning configuration including a maximum core stream and a minimum third stream throat area.
Figure 3:
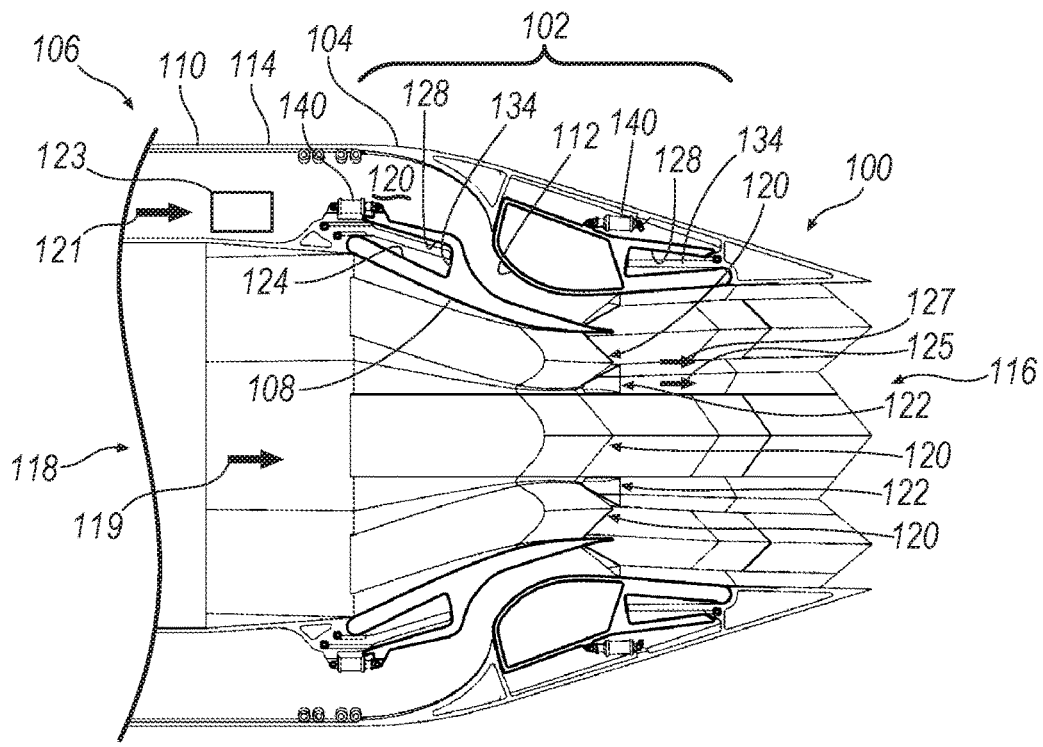
FIG. 3 illustrates a schematic cross-sectional views of the nozzle of FIG. 1, showing the nozzle disposed in a cruising configuration including a minimum core stream throat area and a maximum third stream throat area.

Referring to FIGS. 1-3, the exemplary nozzle 100 may generally include a plurality of flap trains 102 extending around an outer diameter 104 of a gas turbine engine 106. Each flap train 102 may include a convergent or primary flap 108 pivotally attached to a portion of an engine body 110 and a divergent or secondary flap 112 pivotally attached to another portion of the engine body 110 downstream of the convergent flap 108. The nozzle 100 may also include a pneumatic circuit 114 or system communicating with the convergent and divergent flaps 108, 112 and configured to pivot those flaps between a radially inward position and a radially outward position to pass a combination of streams through a fixed overall exit area 116 of the engine 106.

As best shown in FIGS. 2 and 3, the nozzle 100 may define a series of passages for respective streams. These passages may include a throat 118 configured to pass a primary stream 119 including mixed core and bypass flows. Furthermore, a series of variable area passages 120 may be spaced apart from each other along a periphery of the throat 118 and configured to pass a variable area third stream 127 that bypasses a heat exchanger 123. In addition, a series of fixed area passages 122 or slots may be spaced apart from each other along the periphery of the throat 118, alternating positions with the variable area passages 120. The fixed area passages 122 are configured to pass a fixed area third stream 125 that is exhausted from the heat exchanger 123. In this respect, the nozzle may be utilized to exhaust a bifurcated third stream flow 121.

FIG. 2 shows the basic arrangement of the geometry in one exemplary afterburning configuration of the nozzle 100 with a maximum primary stream 119 and a minimum third stream flow 121. In particular, the convergent flaps 108 may be opened to increase an area of the throat 118, while the divergent flaps 112 close the variable area passage 120. FIG. 3 shows the basic arrangement of the geometry in one exemplary nozzle with a minimum area of the throat 118, a maximum area of the third stream 121, e.g. cruise mode. In this respect, the convergent flaps 108 may be closed to a desired area of the throat 118, while the divergent flaps 112 may open the variable area passage 120. Further, the fixed are passages 122 may be fixed.

The fixed overall exit area 116 may be sized based on a diffusion factor from the maximum area of the throat 118 to provide, for example, maximum power afterburning conditions. Therefore, this exit area may result in overexpansion of the nozzle 100 during most other operating conditions. However, the third stream may act like a supersonic ejector at these conditions, filing the plenum and minimizing the overexpansion that the primary stream 119 would otherwise see. The result may be higher performance across vastly different flight conditions while keeping a fixed exit area. The fixed exit area may provide a clean external surface and therefore decrease drag.

The variable internal area nozzle 100 with fixed exit area 116 may be capable of high performance during various flight conditions by actuating internal nozzle geometry by the use of two sets of flaps. Furthermore, the nozzle 100 may use the engine third stream flow as a supersonic ejector at conditions where the nozzle 100 would otherwise be over expanded to minimize nozzle losses. This may alleviate the trade between cruise and after burning performance that would otherwise be expected for a fixed exit area nozzle.

The convergent and divergent flaps 108, 112 may be disposed in the variable area passage 120 and configured to at least control the stream that bypasses the heat exchanger 123. In particular, these flaps can include one or more chambers for receiving a working fluid from a pneumatic circuit 114, which is configured to pivot the respective flaps radially inward or radially outward so as to control flow of the primary stream 119 and the variable area third stream 127. For instance, each convergent flap 108 may include an opening pressure chamber 124 selectively communicating with an opening portion 126 of the pneumatic circuit 114, and the convergent flap 108 may be configured to move radially inward in response to the opening pressure chamber 124 receiving a working fluid from the pneumatic circuit 114. Moreover, the convergent flap 108 may also have a closing pressure chamber 128 selectively communicating with a closing portion 130 of the pneumatic circuit 114, and the convergent flap 108 is configured to move radially outward in response to the closing pressure chamber 128 receiving a working fluid from the closing portion 130 of the pneumatic circuit 114. Each of the opening and closing pressure chambers 124, 128 may be configured to selectively vent working fluid when the other chamber receives working fluid from the pneumatic circuit 114. In one example, the opening pressure chamber 124 of the convergent flap 108 or the divergent flap 112 may be configured to vent working fluid in response to the flap moving radially outward. Moreover, the closing pressure chamber 128 of the flaps may be configured to vent working fluid in response to the flaps moving radially inward to permit movement of the flap.

The divergent flaps 112 may have a configuration of chambers similar to the configuration of the convergent flaps 108. In particular, each divergent flap 112 may include an opening pressure chamber 124 selectively communicating with an opening portion 126 of the pneumatic circuit 114, and the divergent flap may be configured to move radially inward in response to the opening pressure chamber 124 receiving a working fluid from the pneumatic circuit 114. Moreover, the divergent flap 112 may also have a closing pressure chamber 132 selectively communicating with a closing portion 130 of the pneumatic circuit 114, and the divergent flap 112 may be configured to move radially outward in response to the closing pressure chamber 128 receiving a working fluid from the pneumatic circuit 114. Each of the opening and closing pressure chambers 124, 128 may receive a partition 134 extending from the engine body that bifurcates the flaps between respective opening and closing pressure chambers 124, 128. Moreover, the flaps may be configured to selectively vent the working fluid when the other chamber receives working fluid from the pneumatic circuit 114. Continuing with the previous example, the working fluid may be air vented to ambient to permit movement of the flap. It is likely that a controlled leak path in each chamber will be required to prevent overheating. However, one or both of the convergent and divergent flaps 108, 112 may have other suitable configurations.

Each flap may further include one or more seals 136, gaskets, O-rings or other suitable sealing mechanisms adjacent to the respective chambers to prevent the working fluid from leaking out of those chambers. The working fluid may be compressor bled air. By receiving the working fluid and changing the area of the streams, the flaps 108, 112 may act as both flow surfaces and moveable pistons. In particular, pivoting the flaps using regulated compressor bleed air may provide the ability to vary the throat and internal exit areas of the primary and third stream nozzles. The actuated flaps may be segregated from each other by, for example, pivotally attaching the convergent flaps 108 to one location in the nozzle 100 and divergent flaps 112 to another separate location in the nozzle 100. In this example, third stream flow may flow over the convergent flaps 108 that set the area for the primary stream, and the throat 118 for the primary flow area may be dictated by divergent flaps 112 hinged further downstream of the nozzle 100.

Figure 8:
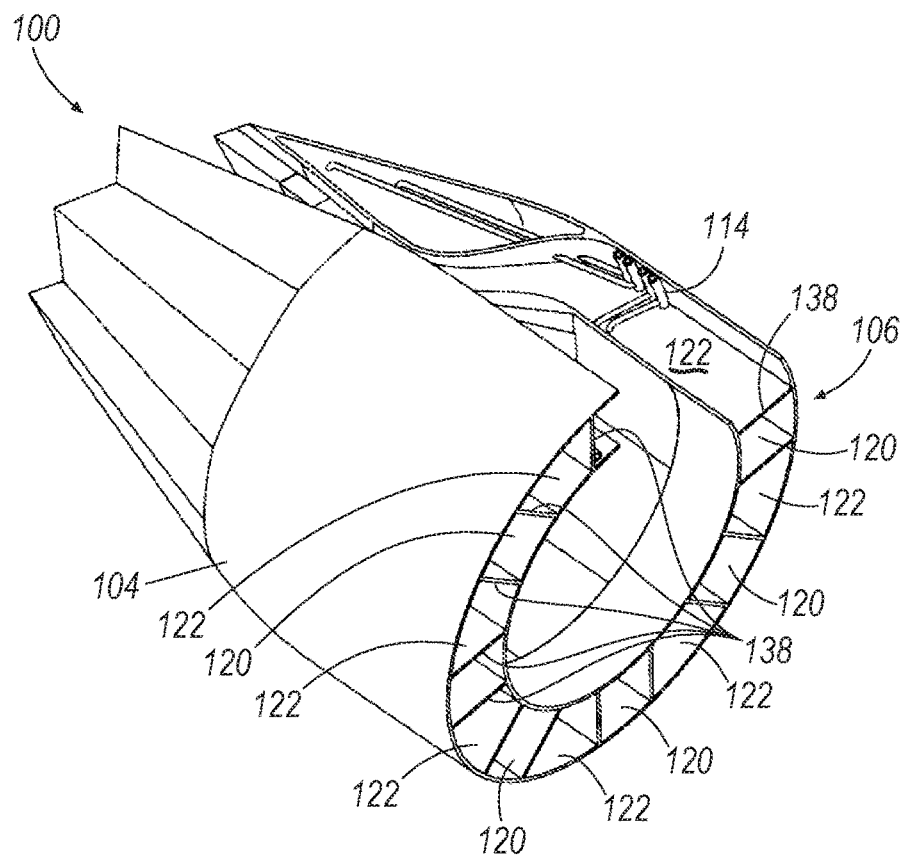
FIG. 8 illustrates a perspective schematic cutaway view of the nozzle of FIG. 1, showing the nozzle having third stream channels, including a portion of channels that have a variable area and another portion that has a fixed area.
Figure 9:
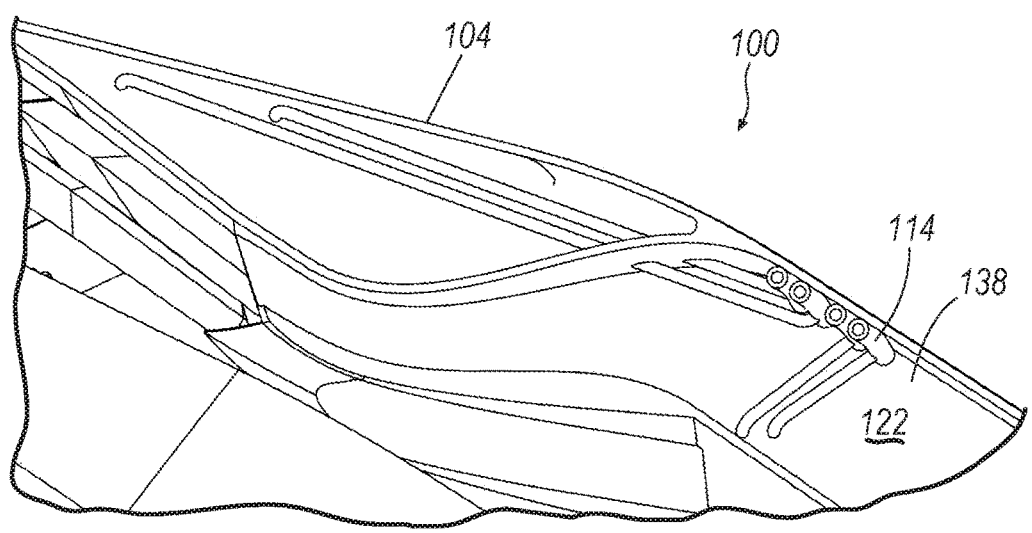
FIG. 9 illustrates an enlarged perspective schematic cutaway view of the nozzle of FIG. 8.

Referring to FIGS. 8 and 9, the exemplary engine body 110 can include a series of sidewalls 138 that define open-ended chambers and are configured to separate adjacent circumferential flap pairs from one another. These sidewalls 138 may be disposed perpendicular to a hinge axis of the flaps so as to form a somewhat constant sealable gap between the sidewalls 138 and the respective flaps. Each sealed flap chamber may provide the ability to utilize HP air from the engine to actuate and rotate the nozzle flaps.

As shown in FIG. 1, all combined streams may exit through the fixed exit area, which may be circular, rectangular, elliptical or other suitable shapes. These shapes may improve control of the flow divergence through the flow path of the nozzle, while also decreasing the boat tail angle. This shape may depend on the flaps and other architecture chosen for the nozzle.

The convergent or primary flaps 108 may be configured to define the minimum throat area 118 of the primary stream. The divergent or secondary flaps 112 may be configured to control the area of the third stream. At maximum power takeoff conditions or afterburning conditions, the convergent flaps 108 and the divergent flaps 112 can be pivoted radially outward to substantially block the third stream to increase the jet thrust through the primary stream. The shaping of these flaps may increase the overall performance of the combined flows.

One non-limiting exemplary advantage of the nozzle 100 is that it permits immediate installation in a gas turbine engine and provides smooth fairing into the fuselage or wing that has spacing constraints. This arrangement may reduce a base drag on an aircraft and reduce complexity in the aircraft. Yet another advantage may be that the nozzle 100 may have flap trains including separate chambers configured to be efficiently sealed and further enable the use of engine air to actuate the flaps thereby eliminating the need for a separate hydraulic system and the accompanying weight. Still another advantage may be that the nozzle having a pneumatic system with conventional hydraulic actuators. Yet another advantage may be that the pneumatic circuit can use compressor bleed or fan air to purge the sealed cavities on the outboard or inboard side of each flap and thus help pressure balance between the chambers of the flap thus reducing actuator load and weight.

Figure 10:
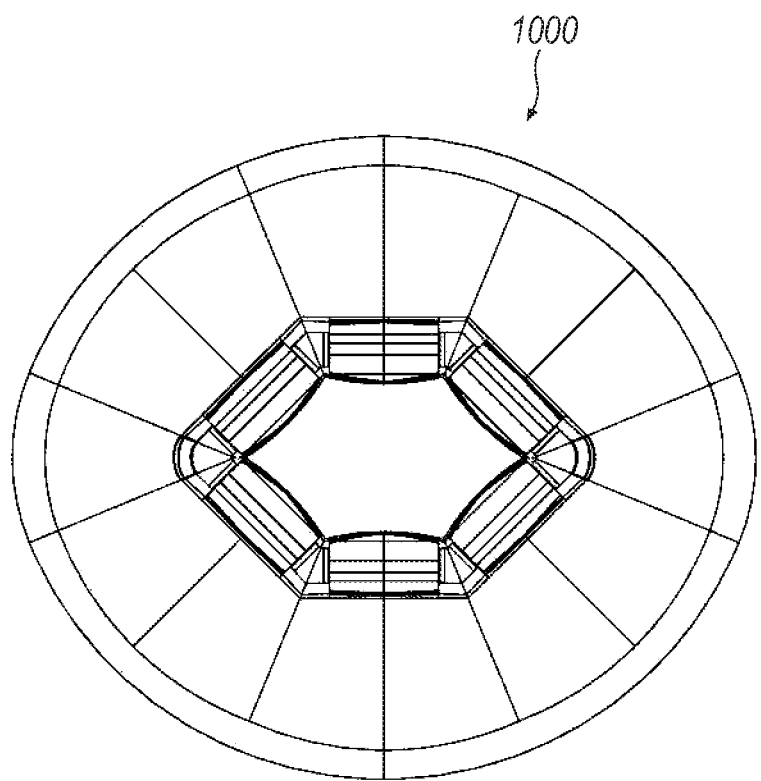
FIG. 10 illustrates an end view of an exemplary nozzle having an "OVAL" configuration.

The nozzle may include external shaping, a shroud or other housing, which surrounds the convergent flaps and the divergent flaps and is configured to provide the fixed exit aperture of the nozzle. In this respect, the number of convergent and divergent flap pairs may be changed along with their corresponding geometric positions, while maintaining the fixed exit aperture. In one embodiment, the nozzle may have an 8-flap cyclic-symmetric configuration in which all flap hinge normal intersect at a common center. As shown in FIG. 10, another embodiment of the nozzle may have an "OVAL" configuration which utilizes 6 flap pairs, 3 upper and 3 lower, with the intersection of the upper flaps and lower flap normal hinge-line vectors being offset by an eccentricity. In another exemplary embodiment, the nozzle may have a 2D configuration, including 1 upper and 1 lower flap pair with fixed sidewalls. However, the nozzle may have multiple other external shapes. For example, the nozzle may have a SERN configuration, in which only the upper flaps may articulate while the opposite lower surface may be fixed. Common to all these configurations is the general shaping of the convergent/divergent flap pairs.

The nozzle may have several different configurations based on the actuation and quantity of the variable area flap system. FIG. 1 shows a concept in which twenty flaps having ten primary flaps and ten secondary flaps arranged in a cyclic symmetrical manner. Each flap train may contain a convergent/divergent flap pair or as, stated above, a convergent flap and a divergent flap. The flaps may be separated by a fixed area angular wedge having an included angle between adjacent convergent/divergent flap hinge lines. The fixed area third stream the cycle may demand streams or flows out these fixed area wedges hence filling the base area and providing the corresponding performance benefit.

Figure 4:
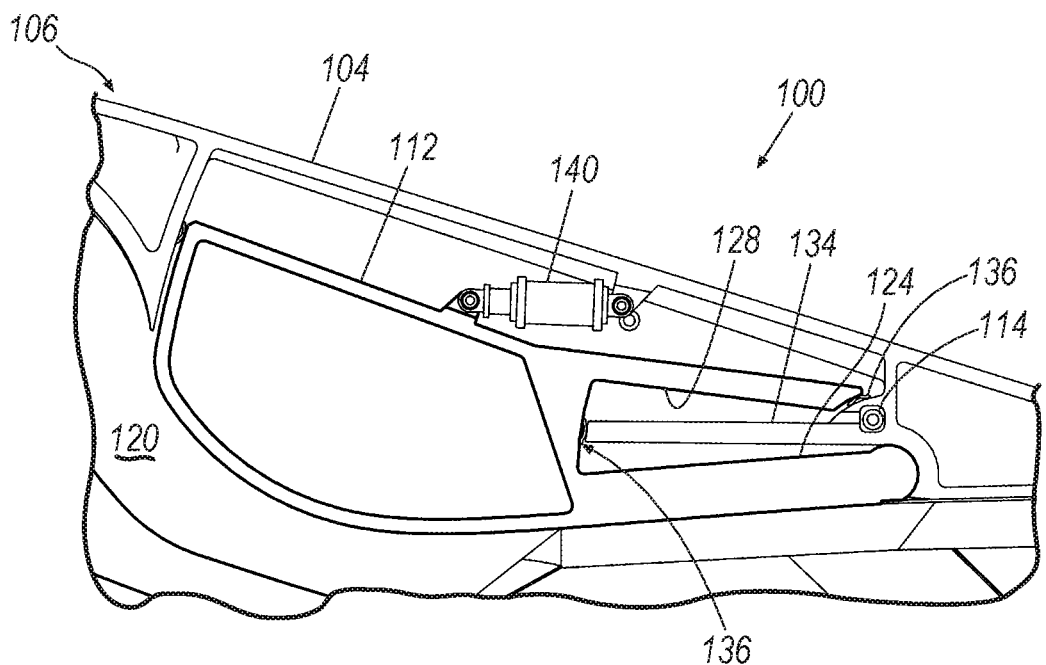
FIG. 4 illustrates an enlarged schematic cross-sectional view of the nozzle of FIG. 2, showing the nozzle having a divergent flap opened to a cruising configuration.
Figure 5:
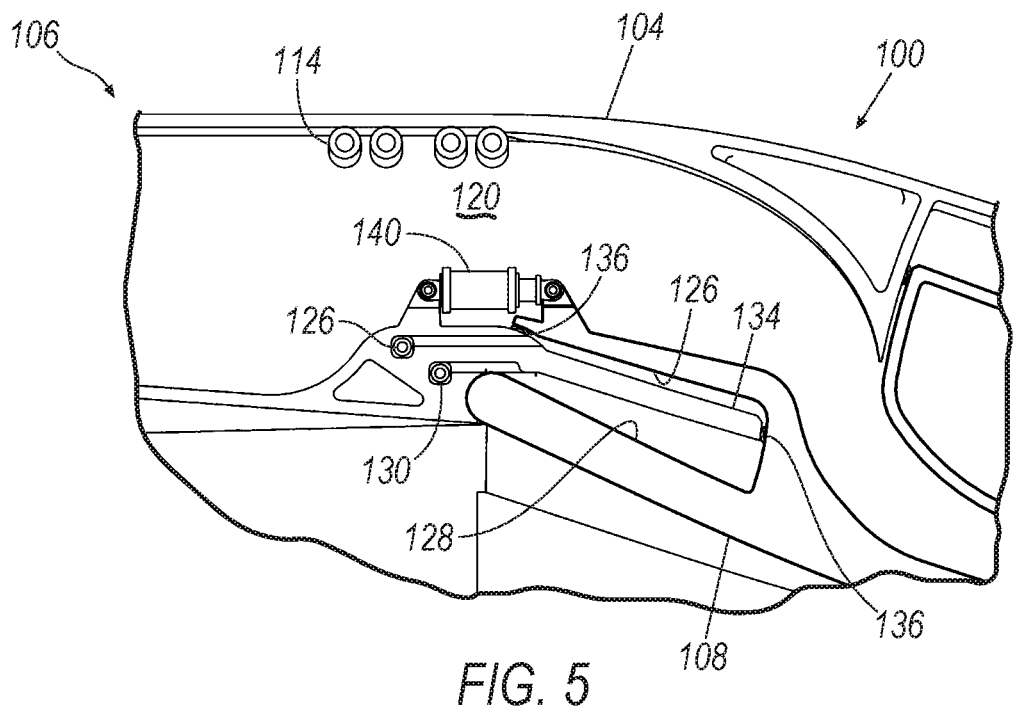
FIG. 5 illustrates an enlarged schematic cross-sectional view of the nozzle of FIG. 2, showing the nozzle having a convergent flap.
Figure 6:
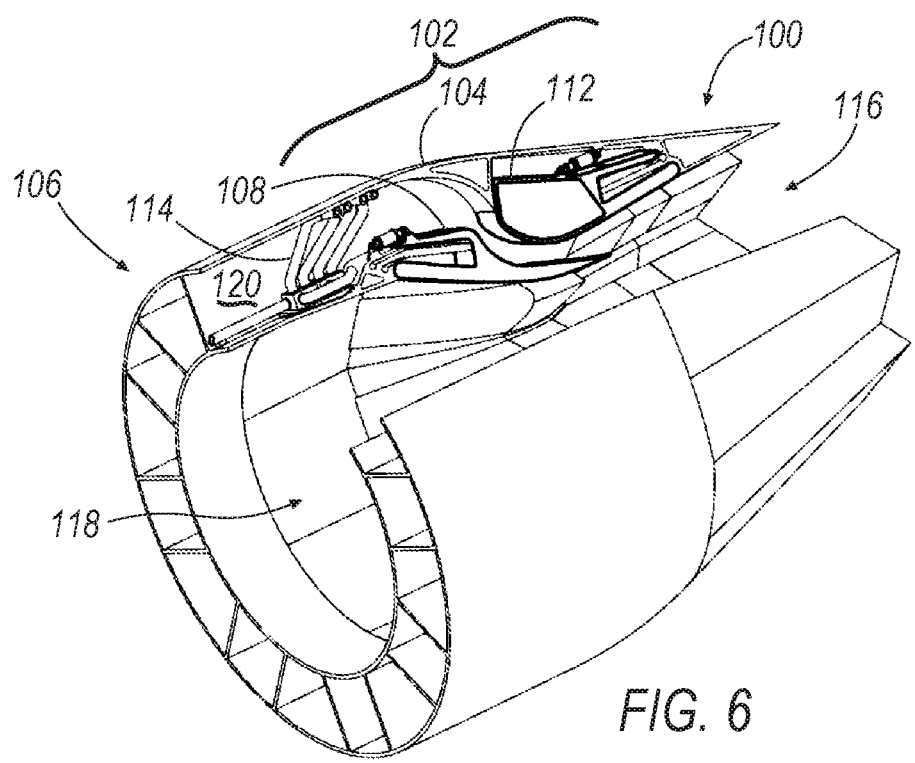
FIG. 6 illustrates a perspective schematic view of the nozzle of FIG. 1, showing the nozzle having convergent and divergent flaps.
Figure 7:
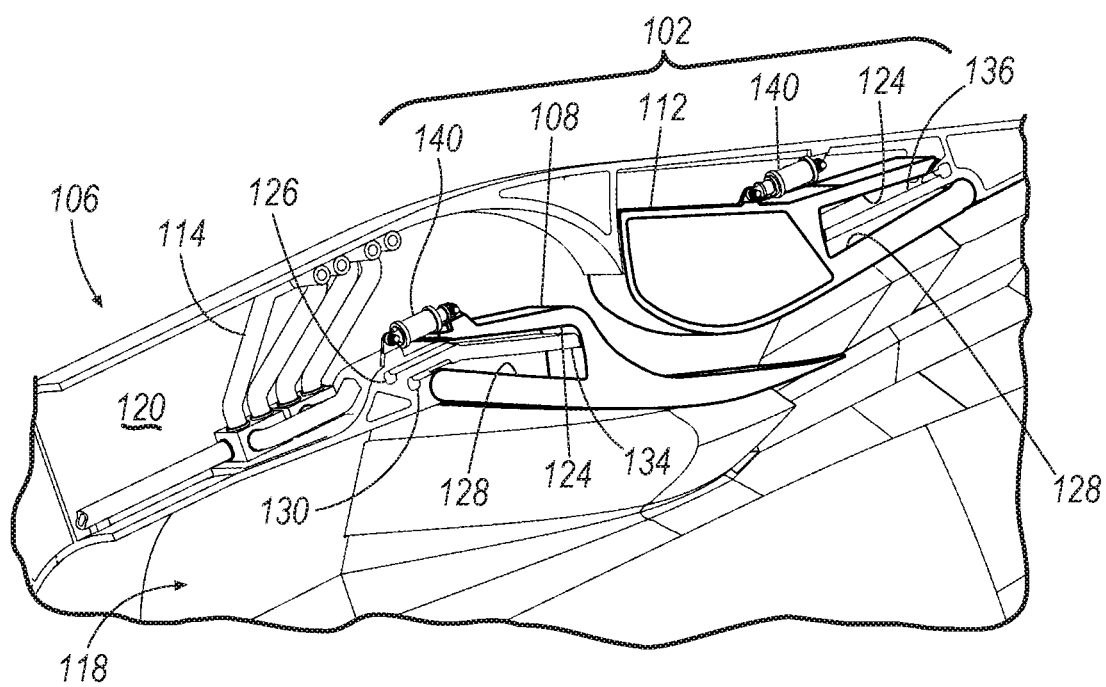
FIG. 7 illustrates an enlarged perspective schematic cross-sectional view of the nozzle of FIG. 6.

Referring back to FIGS. 4 and 5, the nozzle may further include multiple springs 140 attached to the flaps and configured to move the flaps radially inward so as to passively close the nozzle 100 to generate the backpressure during engine start and facilitate with such engine start. Additionally, the damping may be required due to potential stability issues associated with the compressible gas working fluid. In other exemplary illustrations of the nozzle, the working fluid may be a non-compressible hydraulic liquid.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A variable internal exhaust area nozzle for a gas turbine engine, comprising:
   a plurality of flap trains extending around a periphery of the gas turbine engine, with each flap train including a convergent flap pivotally attached to an engine body and a divergent flap pivotally attached to the engine body downstream of the convergent flap; and
   a fluid circuit in communication with the convergent and divergent flaps and configured to pivot the convergent and divergent flaps between a radially inward position and a radially outward position;
   wherein the convergent flap has a closing pressure chamber selectively communicating with a closing portion of the fluid circuit, and the convergent flap is configured to move radially outward in response to the closing pressure chamber receiving a working fluid from the closing portion of the fluid circuit;
   wherein the divergent flap has a closing pressure chamber selectively communicating with a closing portion of the fluid circuit, and the divergent flap is configured to move radially outward in response to the closing pressure chamber receiving a working fluid from the closing portion of the fluid circuit.

2. The variable internal exhaust area nozzle of claim 1, wherein the convergent flap has a closing pressure chamber selectively communicating with a closing portion of the fluid circuit, and the convergent flap is configured to move radially outward in response to the closing pressure chamber receiving a working fluid from the closing portion of the fluid circuit.

3. The variable internal exhaust area nozzle of claim 2, wherein the closing pressure chamber is configured to vent the working fluid in response to the convergent flap moving radially inward.

4. The variable internal exhaust area nozzle of claim 1, wherein the convergent flap has an opening pressure chamber selectively communicating with an opening portion of the fluid circuit, and the convergent flap is configured to move radially inward in response to the opening pressure chamber receiving a working fluid from the opening portion of the fluid circuit.

5. The variable internal exhaust area nozzle of claim 4, wherein the opening pressure chamber is configured to vent the working fluid in response to the convergent flap moving radially outward.

6. The variable internal exhaust area nozzle of claim 1, wherein the divergent flap has a closing pressure chamber selectively communicating with a closing portion of the fluid circuit, and the divergent flap is configured to move radially outward in response to the closing pressure chamber receiving a working fluid from the closing portion of the fluid circuit.

7. The variable internal exhaust area nozzle of claim 6, wherein the closing pressure chamber is configured to vent the working fluid in response to the divergent flap moving radially inward.

8. The variable internal exhaust area nozzle of claim 1, wherein the divergent flap has an opening pressure chamber selectively communicating with an opening portion of the fluid circuit, and the divergent flap is configured to move radially outward in response to the opening pressure chamber receiving a working fluid from the opening portion of the fluid circuit.

9. The variable internal exhaust area nozzle of claim 8, wherein the opening pressure chamber is configured to vent the working fluid in response to the divergent flap moving radially outward.

10. The variable internal exhaust area nozzle of claim 1, further comprising a plurality of side walls that separate the plurality of flap trains adjacent to each other in a circumferential direction.

11. A variable internal exhaust area nozzle for a gas turbine engine, comprising:
   a plurality of flap trains extending around a periphery of the gas turbine engine, with each flap train including a convergent flap pivotally attached to an engine body and a divergent flap pivotally attached to the engine body downstream of the convergent flap;
   a fluid circuit in communication with the convergent and divergent flaps and configured to pivot the convergent and divergent flaps between a radially inward position and a radially outward position; and
   a plurality of side walls that separate the plurality of flap trains adjacent to each other in a circumferential direction, the plurality of side walls extending from one axial end of the nozzle to at least a region between the convergent flap and the divergent flap;
   wherein the nozzle is configured to provide a fixed exit aperture.

12. The variable internal exhaust area nozzle of claim 11, wherein the fixed exit aperture is formed by one of an external shroud and an external housing surrounding the convergent flaps and the divergent flaps.

13. The variable internal exhaust area nozzle of claim 11, wherein each of the convergent flaps and the divergent flaps has a closing pressure chamber selectively communicating with a closing portion of the fluid circuit, and the flaps are configured to move radially outward in response to the closing pressure chamber receiving a working fluid from the closing portion of the fluid circuit.

14. The variable internal exhaust area nozzle of claim 11, wherein each of the convergent flaps and the divergent flaps has an opening pressure chamber selectively communicating with an opening portion of the fluid circuit, and the flaps are configured to move radially inward in response to the opening pressure chamber receiving a working fluid from the opening portion of the fluid circuit.

15. The variable internal exhaust area nozzle of claim 11, wherein each of the convergent flaps and the divergent flaps has an opening pressure chamber configured to vent a working fluid in response to the divergent flap moving radially outward and a closing pressure chamber configured to vent the working fluid in response to the divergent flap moving radially inward.

16. A variable internal exhaust area nozzle for a gas turbine engine, comprising:
   a plurality of flap trains extending around a periphery of the gas turbine engine, with each flap train including a convergent flap pivotally attached to an engine body and a divergent flap pivotally attached to the engine body downstream of the convergent flap; and
   a fluid circuit in communication with the convergent and divergent flaps and configured to pivot the convergent and divergent flaps between a radially inward position and a radially outward position;
   wherein the convergent flap has a closing pressure chamber selectively communicating with a closing portion of the fluid circuit, and the convergent flap is configured to move radially outward in response to the closing pressure chamber receiving a working fluid from the closing portion of the fluid circuit;
   wherein the divergent flap has a closing pressure chamber selectively communicating with a closing portion of the fluid circuit, and the divergent flap is configured to move radially outward in response to the closing pressure chamber receiving a working fluid from the closing portion of the fluid circuit;
   wherein the nozzle defines a throat configured to pass a primary stream;
   wherein the nozzle further defines a series of variable area passages spaced apart from each other along a periphery of the throat;
   wherein the nozzle further defines a series of fixed area passages spaced apart from each other along the periphery of the throat, such that the nozzle is configured to bifurcate a third stream flow; and
   wherein the fluid circuit is one of a pneumatic circuit and a hydraulic circuit.

17. The variable internal exhaust area nozzle of claim 16, wherein the bifurcated third stream flow includes a fixed area third stream exhausted from a heat exchanger and passing through the series of fixed area passages.

18. The variable internal exhaust area nozzle of claim 16, wherein the bifurcated third stream flow includes a variable area third stream bypassing a heat exchanger and passing through the series of variable area passages.

19. The variable internal exhaust area nozzle of claim 16, wherein the variable area passages alternate with the fixed area passages about the periphery of the throat.

20. The variable internal exhaust area nozzle of claim 16, wherein the nozzle is configured to provide a fixed exit aperture.

* * * * *